(12) United States Patent
Reichmann et al.

(10) Patent No.: US 11,570,858 B2
(45) Date of Patent: Jan. 31, 2023

(54) METHOD AND ARRANGEMENT FOR FLASHLAMP CONTROL

(71) Applicant: ROVAK GMBH, Wilsdruff (DE)

(72) Inventors: Udo Reichmann, Wilsdruff (DE); Georg Ochlich, Kesselsdorf (DE); Marcel Neubert, Kreischa (DE)

(73) Assignee: ROVAK GMBH, Wilsdruff (DE)

( * ) Notice: Subject to any disclaimer, the term of this patent is extended or adjusted under 35 U.S.C. 154(b) by 0 days.

(21) Appl. No.: 17/275,752

(22) PCT Filed: Sep. 13, 2019

(86) PCT No.: PCT/EP2019/000265
§ 371 (c)(1),
(2) Date: Mar. 12, 2021

(87) PCT Pub. No.: WO2020/052798
PCT Pub. Date: Mar. 19, 2020

(65) Prior Publication Data
US 2022/0039222 A1    Feb. 3, 2022

(30) Foreign Application Priority Data
Sep. 13, 2018  (EP) ..................................... 18194343

(51) Int. Cl.
*H05B 41/34*        (2006.01)
(52) U.S. Cl.
CPC ..................... *H05B 41/34* (2013.01)
(58) Field of Classification Search
CPC ......... H05B 41/30; H05B 41/32; H05B 41/34
See application file for complete search history.

(56) References Cited

U.S. PATENT DOCUMENTS 4,687,971 A    8/1987  Shimizu

FOREIGN PATENT DOCUMENTS

| EP | 2605623 A1 | 6/2013 |
|----|------------|--------|
| JP | S 61-256370 A | 11/1986 |
| JP | H 02-103899 A | 4/1990 |
| JP | H 04-171196 A | 3/1992 |

(Continued)

OTHER PUBLICATIONS

International Search Report issued in PCT/EP2019/000265 dated Jan. 3, 2020.

(Continued)

*Primary Examiner* — Henry Luong
(74) *Attorney, Agent, or Firm* — Heslin Rothenberg Farley & Mesiti P.C.; Kevin P. Radigan, Esq.

(57) ABSTRACT

A method for flashlamp control, in which a main pulse of the lamp current, producing a flash, is generated, and a pre-pulse of the lamp current is previously generated by application of a bias voltage includes a flashlamp with an ignition electrode, a bias voltage source, a main voltage source and a control system. The load of the flashlamp is minimized during the production of a main pulse by a pre-ignition. A pre-pulse is generated by applying a plasma voltage which is higher than the bias voltage, as an electrode voltage, and igniting a plasma in the flashlamp by means of an ignition electrode and maintaining same by means of the bias voltage during the pre-pulse.

14 Claims, 5 Drawing Sheets

(56) References Cited

FOREIGN PATENT DOCUMENTS

Figure 1:
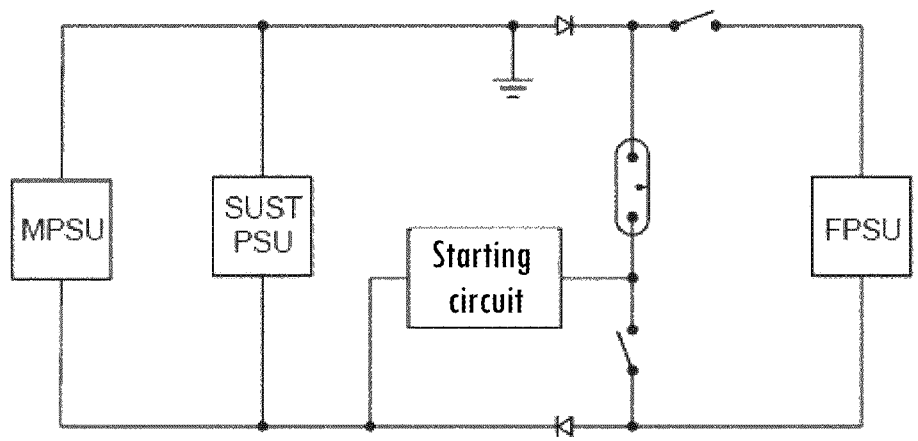

WO          2009095584 A1    8/2009
WO    WO-2009095584 A1 *   8/2009   ............... G01J 3/10

OTHER PUBLICATIONS

Thrum T. et al. "Development of a powerful vortex stabilized water-wall flash lamp for RTP applications", IIEEE, Oct. 3, 2004, vol. 2, pp. 1019-1023.

Jia, Shenli et al.: "The Plasma Channel of Pulsed Flashlamps Working in an Array", Plasma Science and Technology, vol. 15, No. 7; Jul. 2013.

* cited by examiner

METHOD AND ARRANGEMENT FOR FLASHLAMP CONTROL

CROSS REFERENCE TO RELATED APPLICATIONS

This application is the National Phase filing under 35 U.S.C. § 371 of International Application No.: PCT/EP2019/000265, filed on Sep. 13, 2019, which claims priority to European Application No.: 18194343.2, filed on Sep. 13, 2018. The contents of this prior application is hereby incorporated by reference herein in its entirety.

The invention relates to a method for flash lamp control in which a main pulse of the lamp current generating a flash is effected by applying an electrode voltage to the electrodes of a flash lamp, and a pre-pulse of the lamp current is generated by applying a bias voltage prior to flash generation.

BACKGROUND ART

The invention further relates to an arrangement for flash lamp control comprising a flash lamp having a quartz glass tube which is sealed at both ends and which is provided with two electrodes between which an electrode voltage can be applied, an ignition electrode operatively connected to the flashlamp, a bias voltage source generating a bias voltage, a main voltage source and a control system.

Tempering by means of flash lamps, also referred to as FLA (flash lamp annealing), is an innovative process for thermal pre- and post-treatment by means of xenon lamps in the time range of a few thousandths of a second. The ultra-short process time opens up completely new technological possibilities. A significant advantage compared to conventional methods is a locally precise heat supply, limited to the desired substrate area, whereby the temperature load on the substrate decreases and significant energy savings are implemented.

The integration into existing process chains is almost unrestricted due to the compact design.

The principle of flashlamp annealing is based on the pulse-like ignition of a quartz glass tube, the flashlamp, filled with the inert gas xenon, for example. The electromagnetic spectrum emitted in the course of this is absorbed by the substrate and the absorbed energy results in a heating close to the surface for a few thousandths of a second.

The process is adjusted and controlled by the parameters of pulse time, i.e., the duration of illumination of the lamps, and the energy density supplied to the substrate.

In simplified terms, the electronics consists of a damped oscillating circuit, wherein the pulse time is mainly determined by the choice of an inductor in the oscillating circuit and by the capacitance of a capacitor. The capacitor serves as energy storage for the discharge.

Igniting the lamps takes place in a pulse-like manner in that—with the aid of an external electric field (Eext) or by a voltage generated at the electrodes—charge carriers are generated.

A pulse, e.g., ignition pulse, main pulse, pre-pulse, etc., is referred to here as a pulse in the behavior of the lamp current.

The inner diameter of the quartz glass tube limits the plasma volume. From the time of ignition until the maximum plasma expansion is reached, the plasma volume likewise grows in a pulse-like manner (a few µs), the highest stress on the lamp taking place in this phase. With each flash, essentially the electrodes as well as the quartz glass of the lamps are damaged. The electrode temperature increases from room temperature to several hundred ° C., resulting in thermal load on the corresponding lamp components. The critical parameter is mainly the temperature change in the lamp component regions as well as the pressure increase per time. If a lamp-specific energy threshold (the supplied energy corresponds to $E=\frac{1}{2}c\,U^2$) is exceeded, destruction of the electrodes occurs. Destruction is reached as soon as the current increase (dI/dt) exceeds a permissible value or when the maximum current (Ipeak) exceeds a permissible value. Moreover, repeated flashing during normal operation results in a basically unavoidable degradation of the electrodes and thus to a limited service life of the lamp.

To minimize the problem, in addition to lamp cooling, there are also electronic additional components which, with the help of a pre-ignited plasma having substantially smaller energy and/or in a shorter time (compared to the actual flash), effect a preheating of the electrodes. The electronics also improve the temporal reproducibility of the ignition behavior and increase the maximum permissible current density.

A solution is known to exist in an Analog Modules Inc. product in the form of a Flashlamp Simmer Supply Model 864 A, which is used to simmer flashlamps in pulsed laser systems during the time between main discharge pulses. Simmering is nothing more than allowing a trickle current (50 mA to 10 A) to flow in the lamp between pulses. It is applied to have an established conduction path in the flashlamp at the time of the main discharge pulse, resulting in less fluctuation of energy between main pulses. Furthermore, the arc expansion during the pulse is to be less intense, improving the service life of the lamps. In general, both lamp stability and lifetime are to improve with increasing simmer current.

With this solution, a plasma filament (partial ionization) is generated which, however, does not completely fill the plasma space due to the low power. The DC current generated by the simmer leads to preheating of the electrodes, which results in an improvement of the reproducibility of the ignition behavior. The applied current is about 0.5 A on average. However, the critical conditions described above (pressure increase, temperature increase, current increase) are not significantly affected by the simmer. The permanent ion bombardment of the cathode during simmer operation results in damage to the lamp by sputtering off electrode material.

Known through Jia, Shenli et al.: "The Plasma Channel of Pulsed Flashlamps Working in an Array", Plasma Science and Technology, Vol. 15, No. 7; July 1013, is a solution for generating a time-limited plasma which will be referred to as "pre-pulse" in the following. Here, a capacitor with a capacitance of 4 µF is used. The capacitance of the circuit connected in parallel for generating the time-delayed main pulse is larger by a factor of 19. Since the same voltage is applied, the energy of the main pulse is also larger by the factor of the capacitances. In the illustrated variant, it is described that the pre-ignition effects smoother operation of the lamp, whereby the mechanical load caused by shock waves decreases. Pre-ignition also enables faster discharge of the main pulse since the plasma resistance at ignition is already less than infinity. Pulse shaping of the pre-pulse is not provided.

In addition, it can be clearly seen that at the time of ignition of the main pulse, the plasma has not reached the maximum possible expansion.

The closest prior art is considered to be the article T. Thrum et al: Development of a Powerful Vortex Stabilized Water-Wall Flash Lamp for RTP Applications, 0-7803-8486-5/04 IEEE 2004. Therein, pre-ignition is provided at much higher power compared to the simmer. Pre-ignition takes place not only by discharging a capacitor but is generated by means of so-called IGBTs (power supplies by means of an Insulated Gate Bipolar Transistor). With the help of a pure capacitor discharge, the actual main pulse occurs with a time delay. Due to the duration of the pre-ignition, a state is reached at which the plasma has reached the maximum spatial expansion (current approx.: 200 to 800 A). Without the pre-ignition, a significantly higher pressure increase is to be expected as a result of the main pulse.

This solution entails a relatively high gas consumption, which makes the use of argon instead of xenon economically viable. However, the use of argon reduces the effectiveness compared to xenon.

The various power supply components as well as the protective diodes and switches cooperating for the operation of the flash arc lamp according to the closest prior art are shown in FIG. 1.

The flash arc lamp is started and operated by three different power supplies:

A starting circuit (SCCT) as a voltage multiplier for applying up to 45 kV for initial breakdown and for providing sufficient energy to build up the arc current so that the arc drive voltage drops below about 650 V and can be maintained by the power supply (SUST power supply unit). This power supply unit is designed as a low ripple constant current supply to power the arc lamp with a holding current of 15 A.

The main power supply unit (MPSU) provides all the energy required to operate the lamp via its reactive current.

Furthermore, a flash discharge power supply (FPSU) is connected to the circuit.

The typical operation of the flashlamp is that after starting and maintaining the arc by the starting circuit, the main power supply ramps up the arc lamp to a predetermined current value (the so-called the pre-pulse) for at least a few hundred milliseconds.

Figure 2:
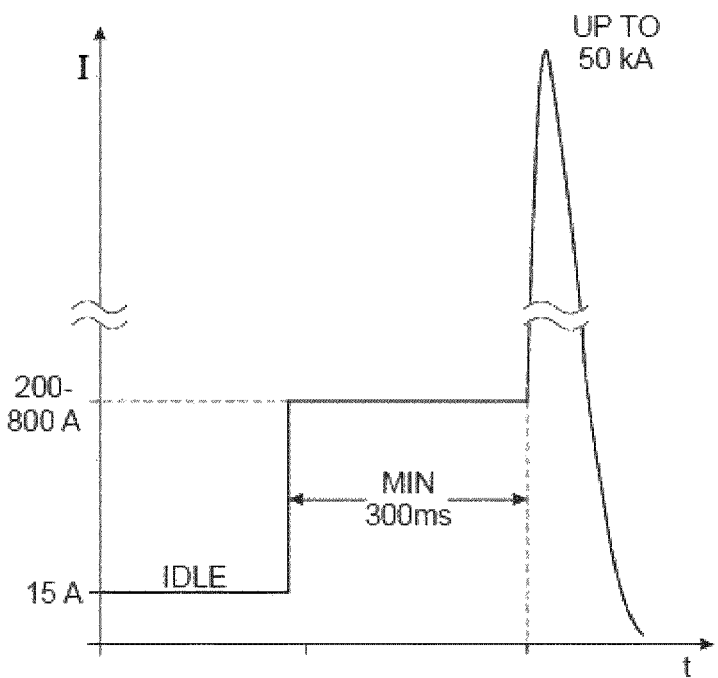

The pre-pulse is long enough to allow the pressure increase during plasma expansion to dissipate before the flash begins. The transient pressure increase during the pre-pulse is significantly reduced compared to a flash that would be directly generated by the no-load current phase because the pre-pulse fills the lamp space with hot plasma prior to the flash, thereby reducing the percentage temperature increase during the flash. A typical arc lamp current during flash operation is shown in FIG. 2.

Pre-ignition in this case requires very costly electronics.

In addition, the maximum possible voltage and the maximum possible current of the IGBTs are limited. The energy of the pre-ignition is thus limited by the IGBTs.

It is therefore an object of the invention to minimize the load on a flashlamp during the generation of a main pulse by a pre-ignition and to implement the pre-ignition, on the one hand, by a simple electronic circuit and, on the other hand, to configure the pre-ignition for further applications in a usable and advantageous manner.

SUMMARY OF THE INVENTION

In terms of the method, the object is achieved by a method of the aforementioned type in which the pre-pulse is generated in that a plasma voltage higher than the bias voltage is applied as electrode voltage and a plasma in the flashlamp is ignited by means of an ignition electrode and is maintained by means of the bias voltage during the pre-pulse. Thus, the plasma in the flashlamp has already reached the maximum possible plasma volume at the time of the main pulse, with the voltage and current not being limited by the limit values of the IGBTS since no IGBTS are required. The reproducibility of the ignition of the plasma is achieved by generating an ignition pulse by means of the ignition electrode. This opens up the possibility of precise timing control and, associated with this, the possibility of simultaneously igniting a plurality of lamps arranged in parallel.

In one embodiment of the method, it is provided
that the bias voltage from a bias voltage source with a first capacitance is applied as electrode voltage,
that in parallel to the bias voltage, but nonreactive with respect to the bias voltage source, the plasma voltage from a plasma voltage source with a second capacitance, which is at least one order of magnitude smaller ($C_2 \ll C_1$) than the first capacitance ($C_1$), is applied as additional electrode voltage,
that the pre-pulse is generated by applying an ignition voltage effecting an ignition pulse generated with the plasma voltage to the ignition electrode, wherein a breakdown is effected by the plasma voltage and is maintained by the bias voltage.

Usually, igniting the plasma in the lamp is not effected by the bias voltage, but only by applying a plasma voltage. In principle, it is possible to select a plasma voltage high enough to ignite the plasma even without an external ignition aid. However, it is appropriate to set the plasma voltage in such a manner that this alone does not ignite the plasma, but that the ignition electrode is used to enable ignition of the plasma only by applying an ignition voltage to the ignition electrode when the plasma voltage is applied. This makes it possible to precisely determine the time of ignition. In this way, an ignition pulse of the lamp current is effected.

The ignition pulse produces a short boost current using a comparatively small capacitance and a high voltage (compared with the bias voltage and main voltage).

Igniting via an ignition electrode also has an advantage when a plurality of lamps is operated in parallel. Namely, if a plurality of lamps (electrically independent) is to be operated synchronously, the ignition pulse is crucial to implement simultaneous ignition.

In one embodiment of the method, it is provided that a main voltage source, which is in parallel to but disconnectable from the bias voltage and plasma voltage sources, applies a main voltage as electrode voltage to generate the main pulse, and the main pulse is generated by applying an ignition voltage generating a main pulse generated by the main voltage to the ignition electrode.

This shows that the flash now consists of three independent superimposed partial pulses—ignition pulse, pre-pulse and main pulse—which, however, are all based on one capacitor discharge each. This makes it possible that only cost-efficient and long-lasting electronics can be used.

The pre-pulse and the main pulse can be tuned independently of each other, i.e., in the case of pre-pulse and the main pulse it is possible to adjust
the pulse duration,
the capacitance (C),
the inductance (L),
the energy
independently of each other (there is no limitation by IGBTs). The energy of the pre-pulse can also exceed the energy of the main pulse if this is technologically necessary, which is not possible in the prior art presented.

In a further embodiment of the method, it is provided that the main voltage source is disconnected from the electrodes during the pre-pulse and is connected to the electrodes only during the main pulse.

In doing so it is avoided that the energy stored in the main voltage source is drawn off already during the pre-pulse.

With an arrangement of the aforementioned type, the object according to the invention is achieved in that a plasma voltage source generating a plasma voltage, the effect of which can be controlled by the ignition electrode, is nonreactively connected in parallel to the bias voltage source, the plasma voltage being greater than the bias voltage.

This makes it possible to charge the plasma voltage source with the plasma voltage, which effects the ignition of the plasma by applying an ignition voltage to the ignition electrode, and then the bias voltage source is used for plasma maintenance. The parallel circuit becomes nonreactive by providing means to prevent the plasma voltage source from discharging into the bias voltage source.

In one embodiment of the arrangement, it is provided that
- the bias voltage source has a first capacitor (1) which is connected to a first charging unit which charges the first capacitor,
- that the plasma voltage source is connected in parallel with the bias voltage source via a first decoupling means,
- that the plasma voltage source has a second capacitor (5) which is connected to a second charging unit charging the second capacitor and which has a capacitance which is at least one order of magnitude smaller than the capacitance of the first capacitor, and
- that the ignition electrode of the flashlamp is connected to an ignition voltage generator which is connected to and controllable by the control system.

The function can now be seen in the fact that the first capacitor is charged to the bias voltage by the first charging unit. Similarly, the second capacitor is charged to the plasma voltage by the second charging unit. The plasma voltage is higher than the bias voltage. Since the plasma voltage source is connected in parallel by decoupling the bias voltage source, the plasma voltage source is not discharged to the bias voltage source. That is, the first capacitor cannot be charged to the plasma voltage, for example. On the other hand, the plasma voltage is thus applied to the electrodes of the lamp.

As already mentioned, the plasma voltage is selected such that the plasma voltage itself is just not yet able to ignite a plasma in the lamp. Only when an ignition voltage is applied to the ignition electrode, igniting the plasma takes place and the ignition pulse of the lamp current occurs. The low capacitance of the second capacitor compared to the first capacitor causes the second capacitor to discharge during the ignition pulse. This means that the bias voltage is now applied to the electrodes as the electrode voltage. The comparatively large capacitance of the first capacitor effects that the latter can be provided with a large amount of charge. This ensures that the lamp current from the first capacitor can flow for the entire duration of the pre-pulse. The advantages and possible uses of this relatively long pre-pulse will be described further below.

In another embodiment of the arrangement, it is provided that the main voltage source comprises a third capacitor connected to a third charging unit charging the third capacitor and that the main voltage source is connected to the electrodes via a switch controllable by the control system.

The function is that during the ignition pulse and the pre-pulse, the main voltage from the main voltage source is not applied to the electrodes. Only when the main pulse is to be ignited, the switch is switched on, whereby the main voltage is applied as electrode voltage. At the same time, the application of an ignition voltage to the ignition electrode causes the lamp to ignite. As a result of the main voltage and the amount of charge stored in the third capacitor, the main pulse of the lamp current is created, which generates the flash.

Expediently, the switch is designed as a thyristor.

The control input of the switch, in particular the gate of the thyristor, is connected to the control unit. This makes it possible to produce the flash in a precisely timed manner.

The temporally coordinated charging and igniting can be effected in particular in that at least one of the charging units is connected to and controllable by the control system.

In another embodiment of the invention, the absence of reaction of the plasma voltage source with respect to the bias voltage source is implemented in that both the bias voltage source and the plasma voltage source are each connected to an electrode of the flashlamp via in each case one diode polarized in the flow direction.

This effects the diode of the plasma voltage source to be forward biased when the plasma voltage is higher than the bias voltage. When the second capacitor is discharged, the plasma voltage source voltage is no longer higher than the bias voltage. Thus, the diode of the plasma voltage source is blocked and the diode of the bias voltage source opens. The bias voltage now acts as the electrode voltage, but it cannot be discharged via the second capacitor.

BRIEF DESCRIPTION OF THE DRAWING FIGURES

Figure 3:
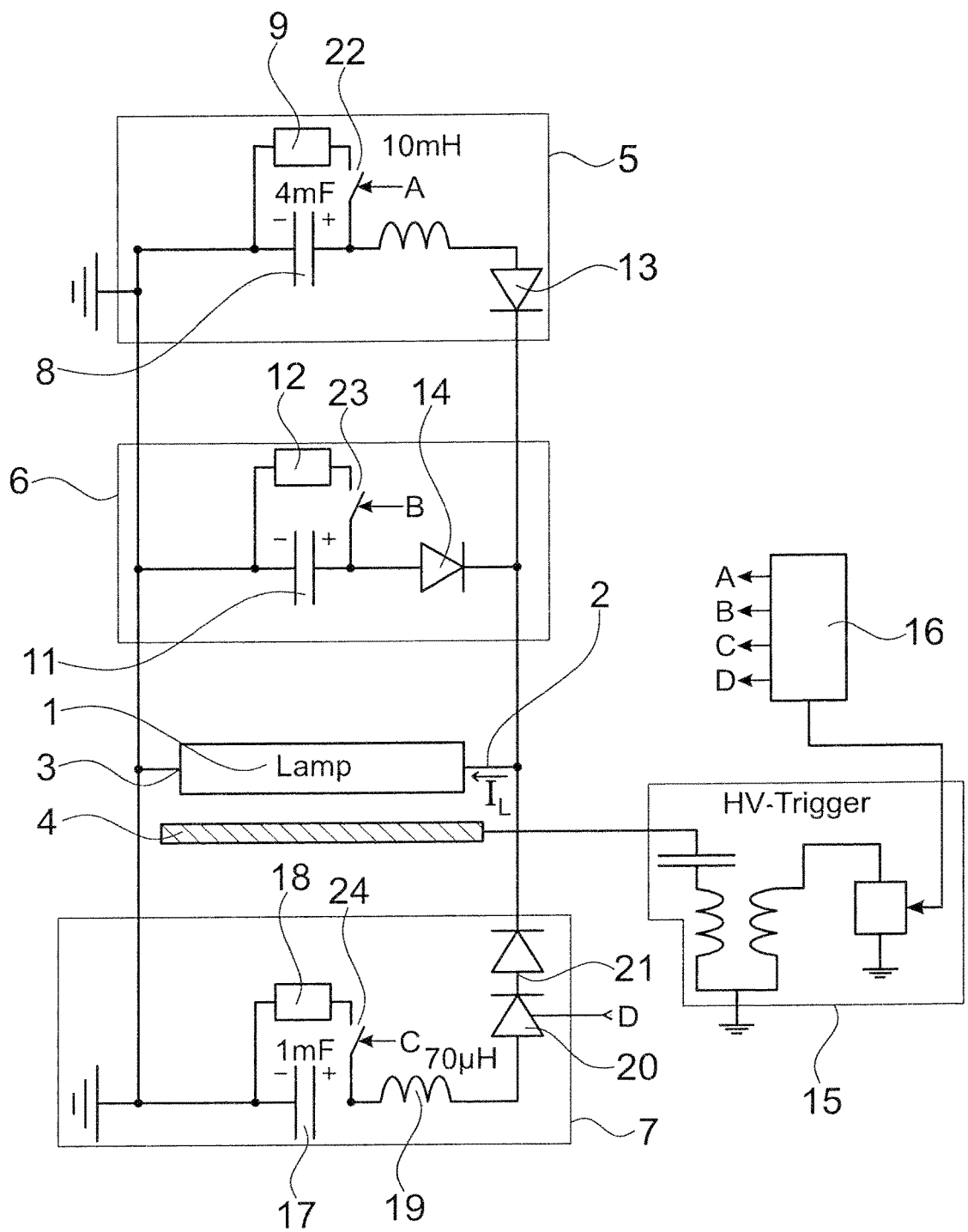
Figure 4:
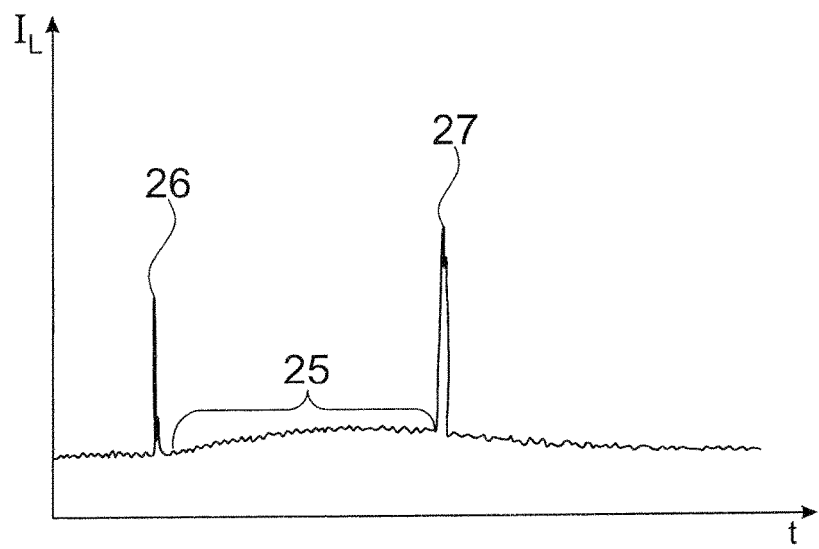
Figure 5:
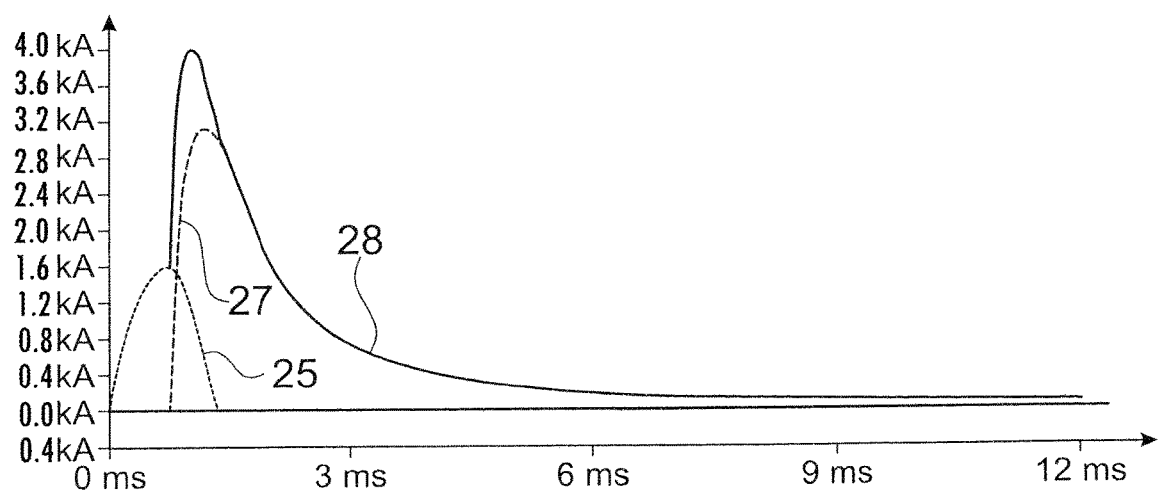
Figure 6:
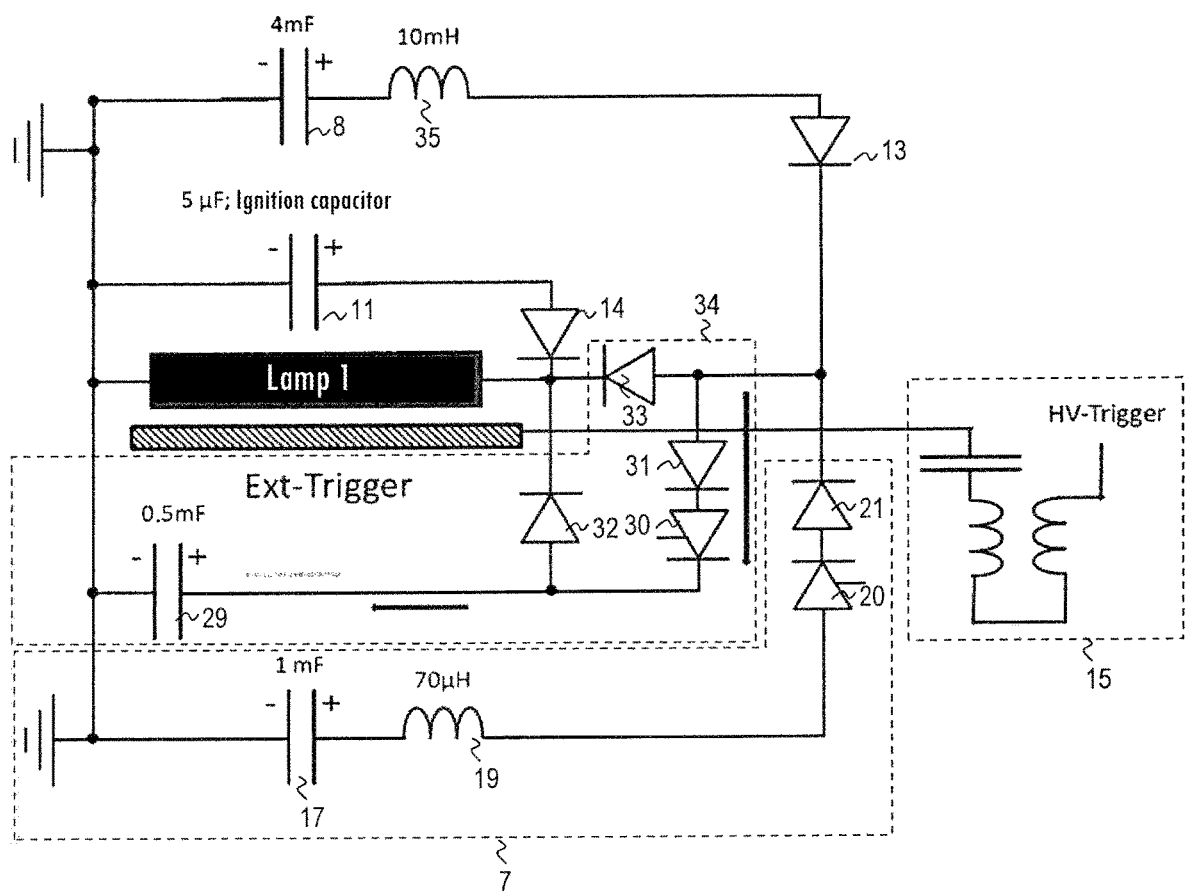
Figure 7:
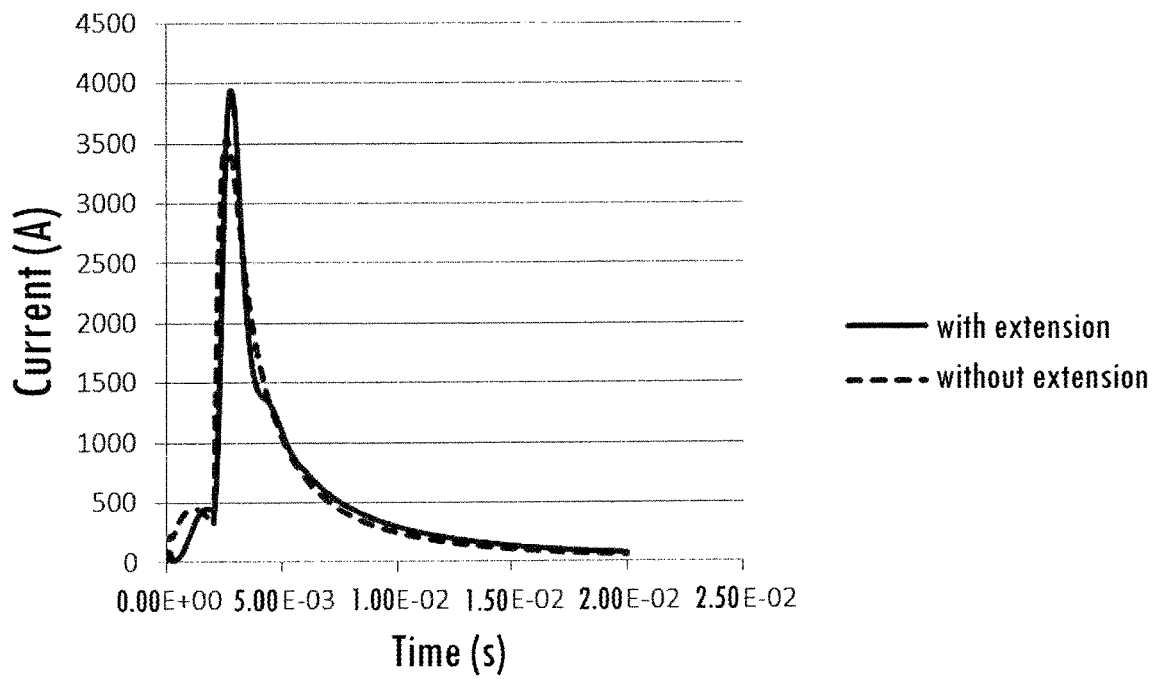
Figure 8:
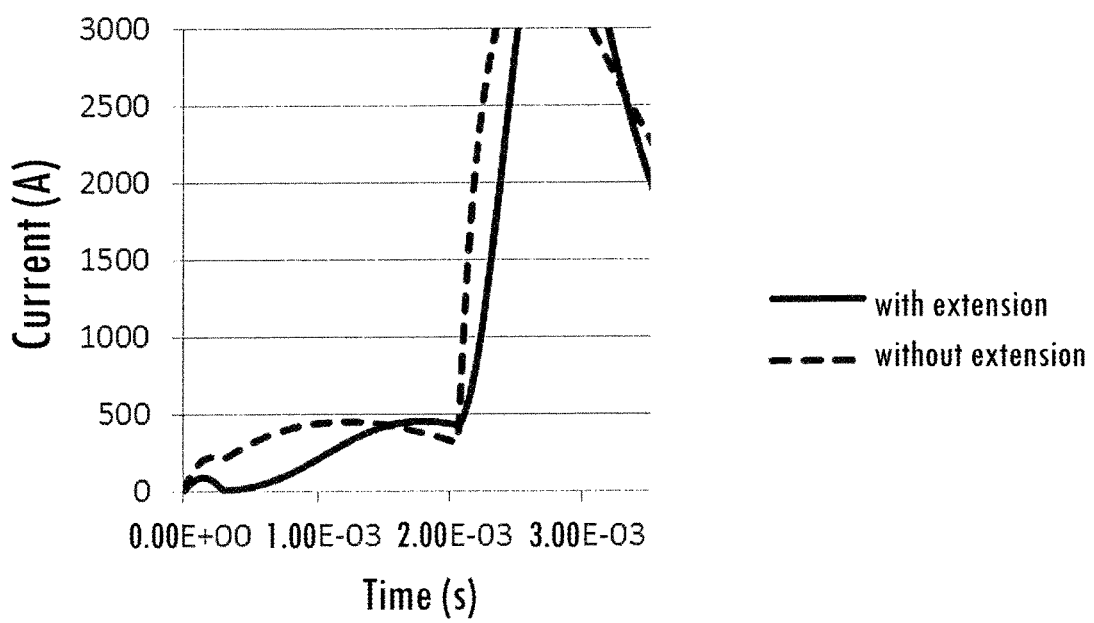

The invention will be explained in more detail below with reference to an exemplary embodiment. In the associated drawings:

FIG. 1 shows an arrangement according to the prior art,

FIG. 2 shows a profile of the lamp current with a pre-pulse according to the prior art, FIG. 3 shows an arrangement for the flashlamp control according to the invention, FIG. 4 shows an illustration of the flash generation according to the invention with three partial pulses, and FIG. 5 shows a simulation of pre-pulse and main pulse and of the resulting total pulse, FIG. 6 shows an arrangement for the flashlamp control with a secondary circuit, FIG. 7 shows a diagram with the current profile with the secondary circuit, and FIG. 8 shows a diagram with an enlarged illustration of the current increase.

DETAILED DESCRIPTION

FIGS. 1 and 2 have already been described in the presentation of the prior art.

FIG. 3 now shows an arrangement with the features according to the invention. It comprises a flashlamp 1 which is provided with two electrodes 2; 3. Furthermore, an ignition electrode 4 is provided, which is arranged immediately adjacent to the flashlamp 1 and is thus operatively connected thereto, since an electric field at the ignition electrode 4 can influence the ignition behavior of the flashlamp 1. Such an ignition electrode can be implemented by a simple wire on the outside of the lamp body or by a reflector or the like.

Between the electrodes 2 and 3, an electrode voltage can be applied which, according to the invention, can be configured as a plasma voltage, bias voltage or a main voltage. Accordingly, a bias voltage source generating a bias voltage, a plasma voltage source generating a plasma voltage, and a main voltage source 7 generating a main voltage are provided.

The bias voltage source 5 has a first capacitor 8 connected to a first charging unit 9 charging the first capacitor 8. The first capacitor 8 together with a first inductor 10 forms an oscillating circuit.

The plasma voltage source 6 has a second capacitor 11 connected to a second charging unit 12 charging the second capacitor 11.

The capacitance C2 of the second capacitor 11 is at least one order of magnitude smaller than the capacitance C1 of the first capacitor 8.

The plasma voltage source 6 is connected in parallel to the bias voltage source 5 via a first decoupling means. This first decoupling means makes the parallel connection nonreactive. This first decoupling means comprises a first diode 13, which is connected in series with the first capacitor 8 and the first inductor 10 and is poled in the flow direction of the lamp current IL flowing to the flashlamp 1. Similarly, the first decoupling means has a second diode 14 which is connected in series with the second capacitor 11 and is likewise poled in the flow direction of the lamp current IL flowing to the flashlamp 1.

The second charging unit 12 charges the second capacitor to the plasma voltage, which is selected to be high enough that reproducible ignition takes place, preferably higher than the bias voltage with which the first capacitor 8 is charged. Thus, the voltage applied to the cathode of the first diode 13 is higher than that applied to the anode thereof and blocks it. On the other hand, the second diode 14 is forward biased because the voltage applied to its anode is higher than that applied to its cathode.

When the second capacitor is discharged, its voltage is less than the bias voltage and the second diode 14 blocks and the first diode 13 is forward biased.

The action of the plasma voltage source 6 is controllable by the ignition electrode 4. For this purpose, the ignition electrode is connected to an ignition voltage generator 15, which is connected to and controllable by a control system 16.

The main voltage source 7 has a third capacitor 17 which is connected to a third charging unit 18 which charges the third capacitor 17 to main voltage. The third capacitor 17 together with a second inductor 19 forms an oscillating circuit.

The main voltage source 7 is connected to the electrodes 2 and 3 via a second decoupling means. The second decoupling means consists of a thyristor 20 and a third diode 21. The main voltage source 7 can be controlled by the control system 16 via the thyristor 20 which acts as a switch.

The charging units 9; 12 or 18 can also be connected to and controllable by the control system 16. As symbolized by the switches 22; 23 and 24, they can be switched off by the control system 16 at certain times, for example, the first charging unit 9 and/or the second charging unit 12 can be switched off during the generation of the main pulse.

However, controlling is not mandatory if the charging units detect the timing of the flash independently or as soon as the voltage has reached the set point.

The assignment of the control inputs of the switches 20; 22; 23 and 24 to the control system 16 is symbolized by the letters A through D.

The function of the arrangement can now be seen in the fact that the bias voltage from the bias voltage source 5 with the first capacitor 8 and its first capacitance C1 is applied as electrode voltage. In parallel to the bias voltage, but—as described above, nonreactive with respect to the bias voltage source—the plasma voltage from the plasma voltage source 6, i.e., from the charged second capacitor 11 with its second capacitance C2, which is at least one order of magnitude lower (C2<<<C1) than the first capacitance C1, is applied as additional electrode voltage. The electrode voltage now corresponds to the plasma voltage, which is significantly higher than the bias voltage.

The pre-pulse 25 shown in FIG. 4 is now generated by applying a plasma voltage higher than the bias voltage as the electrode voltage and by generating an ignition pulse of the lamp current IL by ignition by means of the ignition electrode 4, whereby a plasma is ignited in the flashlamp 1 and maintained by means of the bias voltage during the pre-pulse 25. At the end of the ignition pulse 26, the second capacitor 12 with its small capacitance is discharged. Its function of providing an initial high plasma voltage is fulfilled.

Through the main voltage source 7, which is in parallel to but disconnectable from the bias voltage source 5 and plasma voltage source 6, a main voltage is applied as an electrode voltage during the pre-pulse 25 to generate the main pulse 27. The main pulse 27 is generated in that a main voltage generating the main pulse 27 is applied by the capacitor 17 by switching the thyristor 20.

Analogous to the concepts of the prior art already described, a plasma is ignited before the actual flash. In addition to the oscillating circuit of the actual flash (main pulse), another oscillating circuit (independent with respect to all parameters) is connected in parallel, which serves for generating a pre-pulse 25. At the time of the main pulse 27, the plasma has already reached the maximum possible plasma volume.

A third parallel circuit of the ignition voltage generator 15 supports the reproducibility of the ignition of the pre-pulse 25, which takes place through the ignition electrode 4. The ignition pulse 26 generates with the comparatively small capacitance C2 and a high voltage (compare with the other circuits) a short boost current. If several lamps (electrically independent) are to be operated synchronously, the ignition pulse is crucial to implement simultaneous ignition.

As shown in FIG. 2, the flash now consists of three independent superimposed partial pulses, which, however, are all based on a capacitor discharge. This means that it is possible to use only cost-efficient and long-lasting electronics.

Substantial changes of the plasma resistance occur depending on the lamp length and/or the lamp diameter. The total flash can only be optimal by freely combining the electrical parameters (I and inductance (L) 10 and 19) of pre-pulse 25 and main pulse 27.

In FIG. 5, the lamp current during the pre-pulse 25 is shown in a dotted line, during the main pulse 27 in a dashed line and the addition 28 of both is shown in a solid line.

In the illustration according to FIG. 5, the capacitances are set accordingly in such a manner that the discharge takes place completely at ideal current profiles (with respect to lamp load). In particular in the case of long lamps (large plasma resistance), the damping of the oscillating circuit is very high (long time, capacitor does not discharge completely). To reduce the damping, the capacitance can be reduced or/and the inductance can be increased (higher inductance, however, implies a longer pulse duration). A smaller capacitance in turn means lower energy at the same voltage. To counteract this, the voltage must be increased, which technically limits the component variety and safety of the systems and economically causes higher costs. The aim is therefore to be able to supply sufficient energy at moderate voltages.

As can further be seen from FIG. 5, the energy of the pre-pulse 25 is matched to the energy of the main pulse 27. If the energy of the pre-pulse 25 is too low, the lamp would be destroyed, for example (pressure increase and current increase too high). The flashlamp 1 has already almost reached the minimum resistance at the time of generation of the main pulse 27, which reduces the damping of the main pulse 27 or shortens the pulse time (compared to without pre-pulse 25). Tuning of the electronic parameters is mandatory for operation in the illustrated variant. Incorrectly tuned networks would, for example, cause the plasma to go out even though the capacitors are not yet substantially discharged.

In addition, there are technological possibilities which have not yet been implemented by the invention, which are described in the following.

By a clever combination of pre-pulse and main pulse, a substrate irradiated by the flashlamp or an arrangement of multiple flashlamps can be heated in two stages, but within only one pulse. Thus, the preheating, as it is known, e.g., by IR-emitters, can be completely or partially omitted. Preheating substantially serves to achieve a necessary temperature rise while preventing the destruction of the substrate.

A reduction of conventional preheating by the invention reduces the overall thermal budget and suppresses, for example, diffusion processes in the substrate or substrate layers.

Moreover, in combination with conventional preheating, higher maximum temperatures can be implemented by the two-stage pulse. This makes it possible to produce novel materials that cannot be implemented with previous processes.

Another possible embodiment when using the invention is the combination of two flashlamp arrays, one from the substrate back side and one from the substrate top side. The pre-pulse is applied synchronously for both lamp fields. Furthermore, the ignition of the main pulse is additionally performed from the top side. With this type of application, the substrate is effectively preheated from both sides (reduction of thermal stress) with the top side being additionally brought to the required target temperature with a short main pulse.

In another exemplary embodiment, the basic principle of the previous arrangement remains and is referred to below as the primary circuit. As shown in FIG. 6, the extension consists of an additional fourth capacitor 29, preferably with a capacitance in the range 100 μF-2000 μF, as well as a second thyristor 30 and a fourth diode 31, a fifth diode 32 and a sixth diode 33. The extension is referred to below as secondary circuit 34. In it, the fourth capacitor 29 in series with the fifth diode is connected to the electrode 2. Inserted into the line to electrode 2 is the sixth diode 33, to the anode of which a series connection of the fourth diode 31 and the second thyristor is connected, which series connection is in parallel with the fourth diode 31.

The essential elements first capacitor 8, coil 35 and flashlamp 1 remain and, furthermore, form an oscillating circuit. The pulse is shaped (current curve) by the inductance I of coil 35, the capacitance C of the first capacitor 8 and the resistance R of flashlamp 1. The increase of capacitance C and resistance R leads to damping of the oscillating circuit, and the increase of inductance I counteracts this. The spectrum emitted by the flashlamp 1 as well as the efficiency of the flashlamp $$1 \left(\text{conversion of electrical energy} = \frac{c}{2} \cdot U^2 \text{ into electro-magnetic radiation}\right)$$

are substantially influenced by the current IL flowing through the flashlamp 1. It is assumed here that all other factors for influencing the yield have already been optimally selected. A damping that is too high causes a prolonged discharge process, which results in a non-optimal current flow; i.e., the pulse time is widened and the current that flows is too low (with regard to the efficiency). For this reason, among other things, the capacitance C of capacitor 8 cannot be selected to be arbitrarily high.

During operation of the flashlamp 1, the plasma diameter reaches the inner diameter of the quartz tube, which delimits the plasma. Until this degree of expansion of the plasma is reached, the energy supplied to the flashlamp 1 is required to generate the plasma (no yield in the form of electromagnetic radiation). For this reason, the diameter of the flashlamp 1 cannot be selected to be arbitrarily large. The resistance of the flashlamp can be given in simplified form by $$K = 1.28 \cdot l \cdot \left(\frac{p}{g}\right)^2 \cdot \frac{1}{d(t)}$$

wherein the following designations are used:
  K flash lamp impedance
  p filling pressure
  l lamp length
  d(t) time-dependent plasma diameter
  g gas-type-dependent constant At the time of maximum plasma expansion, the formula is simplified with $d(t)=d_{quarz}$:

$$K^* = 1.28 \cdot l \cdot \left(\frac{p}{g}\right)^2 \cdot \frac{1}{d_{quartz}}$$

The resistance increases with the increase of the filling pressure and the resistance decreases with the increase of the inner diameter of the quartz glass tube. The filling pressure and the inner diameter of the quartz glass tube are selected optimally.

Increasing the lamp length also causes the resistance to increase.

To increase the range of applications, there is a need to use longer flashlamps. However, with increasing lamp length, the resistance of the lamp plasma increases, without having a decisive possibility of influence to counteract it. The value is defined by the lamp geometry. In addition, with a longer lamp length, more energy must be provided to generate the correspondingly required energy density. The increase in voltage is limited to 5 kV for cost reasons. Therefore, the energy increase is also achieved by increasing the capacitance in the primary circuit to increase the energy. However, this results in more damping of the oscillating circuit.

At the time of ignition, the flashlamp has an infinitely large resistance, which decreases to a lamp-dependent minimum value K* by generating charge carriers. The current generated by the discharge of the capacitor 8 is mainly limited by the lamp resistance or correlates with the lamp impedance K* in the dependence shown above. For longer lamps (greater resistance), this results in a partial discharge of the capacitor 8, up to the preferred time of ignition of the thyristor 20. Due to the residual charge of capacitor 8, there is also a partial discharge of the capacitor 17 when the residual voltage of capacitor 8 is reached and the thyristor goes out since no potential difference and no current flow occurs. Capacitors 8 and 17 are not reproducibly discharged or are only partially discharged.

The extension with the secondary circuit 34 leaves the function of the elements 4, 6 and 15 for ignition of the plasma unaffected.

After the ignition process, first, the capacitor 8 is discharged in that a current flows through flashlamp 1 and, in addition, the additional fourth capacitor 29 of the secondary circuit 34 is charged. With the extension, the discharge current increases or the complete discharge of the first capacitor 8 is achieved in a shorter time. Thus, igniting the thyristor 20 is possible at a shorter time with the capacitor 8 fully discharged. The energy of the first capacitor 8 is thus temporarily stored, with the discharge of the fourth capacitor 29 of the secondary circuit 34 taking place at the same time as the discharge of the capacitor 17.

The resulting advantages of the secondary circuit 34 as shown in the diagrams according to FIGS. 7 and 8 are
a) a higher peak current (1),
b) a lower current increase (lamp current) during the discharge of capacitor 8,
c) a complete discharge (3) of both capacitors, and
d) a shorter pulse width (4)/higher peak current.
To a)
The lamp has an optimum operating point with respect to the current. The higher the current, the higher the efficiency (conversion of electrical energy into radiant energy) and the greater the UV component (for the operating range shown).
To b)
A small increase in current (importantly achieved here without additional inductance) causes less damage to the lamp electrodes until full plasma expansion is reached. A comparable effect could be achieved by increasing the inductance, but this increases the pulse time. This results in a lower peak current.
To c)
When the capacitors of the primary circuit are completely discharged, the entire stored energy is used.
To d)
Shorter pulse times are advantageous for certain applications and also increase the surface temperature on the substrate (with the same energy), or the energy can be reduced (energy saving).

The extension by the secondary circuit is particularly advantageous in the case of increased lamp impedance K>20. This value is achieved in the case of optimal lamp parameters with a lamp length greater than 200 mm. The same relationship is effective in the case of a series connection of a plurality of lamps which, for example, are arranged geometrically in parallel to cover larger areas.

In another embodiment of the invention, an additional thyristor, not shown in more detail, is integrated to determine the time of the discharge process of capacitor 8 (previously only diode). With the additional thyristor, the temporarily stored energy can be supplied to the lamp plasma in a temporally controlled manner for optimum pulse shaping.

REFERENCE LIST 1 flashlamp
2 electrode
3 electrode
4 ignition electrode
5 bias voltage source
6 plasma voltage source
7 main voltage source
8 first capacitor
9 first charging unit
10 first inductor
11 second capacitor
12 second charging unit
13 first diode
14 second diode
15 ignition voltage generator
16 control system
17 third capacitor
18 third charging unit
19 second inductor
20 thyristor
21 third diode
22 switch
23 switch
24 switch
25 pre-pulse
26 ignition pulse
27 main pulse
28 addition
29 fourth capacitor
30 second thyristor
31 fourth diode
32 fifth diode
33 sixth diode
34 secondary circuit
35 coil

The invention claimed is:

1. A method for flashlamp control in which a main pulse of a lamp current generating a flash is effected by applying an electrode voltage to electrodes of a flashlamp comprising: prior to the flash generation, a pre-pulse of the lamp current is generated by applying a plasma voltage and a bias voltage, wherein the pre-pulse is generated in that the plasma voltage, which is higher than the bias voltage, is applied as the electrode voltage, and a plasma is ignited in the flashlamp by an ignition voltage applied to an ignition electrode and, and once ignited, is maintained during the pre-pulse by the bias voltage applied as the electrode voltage.

2. The method according to claim 1, wherein:
the bias voltage is from a bias voltage source with a first capacitance (C1) and is applied as the electrode voltage,
in parallel to the bias voltage, but nonreactive with respect to the bias voltage source, the plasma voltage is applied as additional electrode voltage from a plasma voltage source with a second capacitance (C2), which is at least one order of magnitude smaller (C2<<C1) than the first capacitance (C1),
the pre-pulse is generated by applying an ignition voltage effecting an ignition pulse generated with the plasma voltage to the ignition electrode, wherein a breakdown is effected by the plasma voltage and is maintained by the bias voltage.

3. The method according to claim 1, wherein a main voltage source, which is in parallel to but disconnectable from a bias voltage source supplying the bias voltage and a plasma voltage source supplying the plasma voltage, applies a main voltage as the electrode voltage for generating the main pulse.

4. The method according to claim 1, wherein a main voltage source is disconnected from the electrodes during the pre-pulse and is connected to the electrodes only during the main pulse.

5. An apparatus for flashlamp control comprising: a flashlamp which is provided with two electrodes between which an electrode voltage can be applied; an ignition electrode which is operatively connected to the flashlamp; a bias voltage source operative to generate a bias voltage across the two electrodes; a main voltage source and a control system to generate a main pulse of the lamp current; wherein a plasma voltage source operative to generate a plasma voltage across the two electrodes, the effect of which can be controlled by the ignition electrode, is nonreactively connected in parallel to the bias voltage source, with the plasma voltage being greater than the bias voltage, and wherein a pre-pulse is generated by the plasma voltage and the bias voltage being applied across the two electrodes, with a plasma being ignited in the flashlamp by an ignition voltage also being applied to the ignition electrode, and once ignited, is maintained during the pre-pulse by the bias voltage being applied across the two electrodes.

6. The apparatus according to claim 5, wherein:
the bias voltage source has a first capacitor which is connected to a first charging unit to charge the first capacitor,
the plasma voltage source is connected in parallel to the bias voltage source via a first decoupling means,
the plasma voltage source has a second capacitor which is connected to a second charging unit to charge the second capacitor and which has a capacitance (C2) which is at least one order of magnitude smaller than the capacitance (C1) of the first capacitor, and
the ignition electrode of the flashlamp is connected to an ignition voltage generator which is connected to and controllable by the control system.

7. The apparatus according to claim 5, wherein the main voltage source comprises a third capacitor which is connected to a third charging unit to charge the third capacitor, and that the main voltage source is connected across the two electrodes via a switch which can be controlled by the control system.

8. The apparatus according to claim 7, wherein the switch is designed as a thyristor.

9. The apparatus according to claim 6, wherein at least one of the first or second charging units is connected to and controllable by the control system.

10. The apparatus according to claim 9, wherein the absence of reaction of the plasma voltage source with respect to the bias voltage source is implemented in that both the bias voltage source and the plasma voltage source are connected to an electrode of the flashlamp via in each case one diode oriented in current flow direction.

11. The apparatus according to claim 6, wherein the main voltage source comprises a third capacitor which is connected to a third charging unit to charge the third capacitor, and that the main voltage source is connected across the two electrodes via a switch which can be controlled by the control system.

12. The apparatus according to claim 11, wherein the switch is designed as a thyristor.

13. The apparatus according to claim 7, wherein at least one of the first, second or third charging units is connected to and controllable by the control system.

14. The apparatus according to claim 8, wherein at least one of the first, second or third charging units is connected to and controllable by the control system.

* * * * *